United States Patent
Davis et al.

(10) Patent No.: US 6,311,167 B1
(45) Date of Patent: Oct. 30, 2001

(54) PORTABLE 2-WAY WIRELESS FINANCIAL MESSAGING UNIT

(75) Inventors: Walter Lee Davis, Parkland, FL (US); Jeff LaVell, Mesa, AZ (US); Victoria A. Leonardo; Barry W. Herold, both of Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/996,176

(22) Filed: Dec. 22, 1997

(51) Int. Cl.[7] .............................. G06F 17/60; H04B 1/04
(52) U.S. Cl. ............................ 705/35; 705/35; 705/39; 705/40; 705/41; 235/379; 235/380; 380/4; 380/23; 380/24; 380/25; 340/311
(58) Field of Search ................................... 705/35, 39, 41, 705/40; 340/311.1; 235/379; 380/23, 4, 24, 25

(56) References Cited

U.S. PATENT DOCUMENTS

| | | |
|---|---|---|
| 4,305,059 | 12/1981 | Benton . |
| 4,529,870 | 7/1985 | Chaum . |
| 4,575,621 | 3/1986 | Dreifus . |
| 4,707,592 | 11/1987 | Ware . |
| 5,159,632 | 10/1992 | Crandall . |
| 5,192,947 | 3/1993 | Neustein . |
| 5,265,033 | 11/1993 | Vajk et al. . |
| 5,285,496 | 2/1994 | Frank et al. . |
| 5,347,580 | 9/1994 | Molva et al. . |
| 5,359,182 | 10/1994 | Schilling . |
| 5,371,493 | 12/1994 | Sharpe et al. . |
| 5,412,192 | 5/1995 | Hoss . |
| 5,440,634 | 8/1995 | Jones et al. . |
| 5,442,707 | 8/1995 | Miyaji et al. . |
| 5,452,356 | 9/1995 | Albert . |
| 5,453,601 | 9/1995 | Rosen . |
| 5,455,864 | 10/1995 | Park . |
| 5,467,398 | 11/1995 | Pierce et al. . |

(List continued on next page.)

FOREIGN PATENT DOCUMENTS

| | | |
|---|---|---|
| 0567610B1 | of 0000 | (EP) . |
| 0172670 | 7/1985 | (EP) . |
| 0738992A1 | 10/1996 | (EP) . |
| 403267826-A * | 12/1991 | (JP) .............................. H04B/7/26 |
| WO93/08545 | of 0000 | (WO) . |
| WO93/07596 | 4/1993 | (WO) . |
| WO96/32700 | 3/1996 | (WO) . |
| WO96/25828 | 8/1996 | (WO) . |
| WO96/36025 | 11/1996 | (WO) . |

OTHER PUBLICATIONS

Creating Tomorrow's Multimedia Systems Toady, AT&T Technology; New York: Fall 92; vol. 7; issue 3, pp. 24+.*
"Secure Electronic Transaction (SET) Specification", Book 1: Business Description, Draft for testing Jun. 17, 1996.
"Secure Electronic Transaction (SET) Specification," Book 2: Programmer's Guide, Draft for testing Jun. 21, 1996.
"Secure Electronic Transaction (SET) Specification", Book 3: Formal Protocol Definition, Draft for Testing Jun. 24, 1996 with revisions on Aug. 1, 1996.

(List continued on next page.)

Primary Examiner—James P. Trammell
Assistant Examiner—Nga B. Nguyen
(74) Attorney, Agent, or Firm—Randi L. Dulaney

(57) ABSTRACT

A portable 2-way secure financial messaging unit (906) includes a receiver (804), a selective call decoder (1004), a financial transaction processor (1014), a main processor (1006), and a transmitter (1034). A received secure financial transaction message is decoded by the selective call decoder (1004) and either passed directly to a financial transaction processor (1014) in the secure financial messaging unit or to a smart card to prevent unauthorized access to information contained in the secure financial transaction message. The portable 2-way secure financial messaging unit (906) may originate as well as receive financial transactions.

31 Claims, 10 Drawing Sheets

U.S. PATENT DOCUMENTS

| | | |
|---|---|---|
| 5,473,143 | 12/1995 | Vak et al. . |
| 5,473,667 | 12/1995 | Neustein . |
| 5,477,215 | 12/1995 | Mandelbaum . |
| 5,481,255 | 1/1996 | Albert et al. . |
| 5,483,595 | 1/1996 | Owen . |
| 5,510,778 | 4/1996 | Krieter et al. . |
| 5,521,363 | 5/1996 | Tannenbaum . |
| 5,539,189 | 7/1996 | Wilson . |
| 5,541,583 | 7/1996 | Mandelbaum . |
| 5,557,518 | 9/1996 | Rosen . |
| 5,572,004 | 11/1996 | Raimann . |
| 5,585,787 | 12/1996 | Wallerstein . |
| 5,585,789 | 12/1996 | Haneda . |
| 5,590,038 | 12/1996 | Pitroda . |
| 5,591,949 | 1/1997 | Bernstein . |
| 5,613,212 * | 3/1997 | Wong et al. ................... 340/311.1 |
| 5,701,414 * | 12/1997 | Cheng et al. ................... 395/200.09 |
| 5,721,781 * | 2/1998 | Deo et al. ............................. 380/23 |
| 5,748,737 * | 5/1998 | Daggar ................................. 235/379 |
| 5,933,816 * | 8/1999 | Zeannah et al. ....................... 705/35 |

OTHER PUBLICATIONS

"Standard for RSA, Diffie–Hellman & Related Public–Key Cryptography", Part 6: Elliptic Curve Systems (Draft 5), Working Draft.

"Electronic Documents & Digital Signaturing: Changing the Way Business is Conducted and Contracts are Formed", by Paul R. Katz & Aron Schwartz, IPL Newsletter, vol. 14, No. 2, Winter 1996.

"In Introduction to Electronic Money Issues".

"An Introduction to Electronic Money Issues" prepared for the US Dept of the Treasury Conference, Toward Electronic Money & Banking: the Role of Govt, Sep. 19–20, 1996 Washington, DC.

"Electronic Banking Law and Commerce Report", Devoted to the Emerging Law of Cyberbanking pp. 8–12, 12–17.

"A Standard Code for Radiopaging", British Post Officee.

* cited by examiner

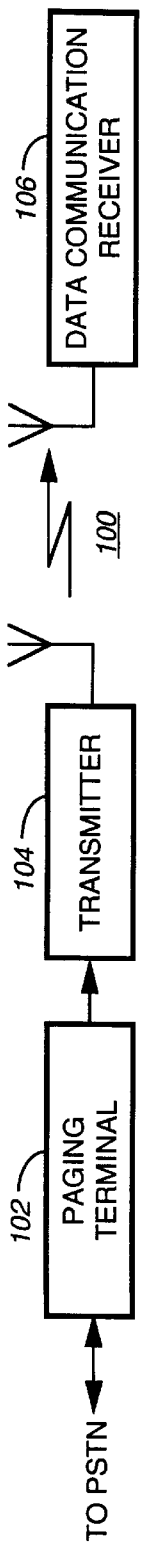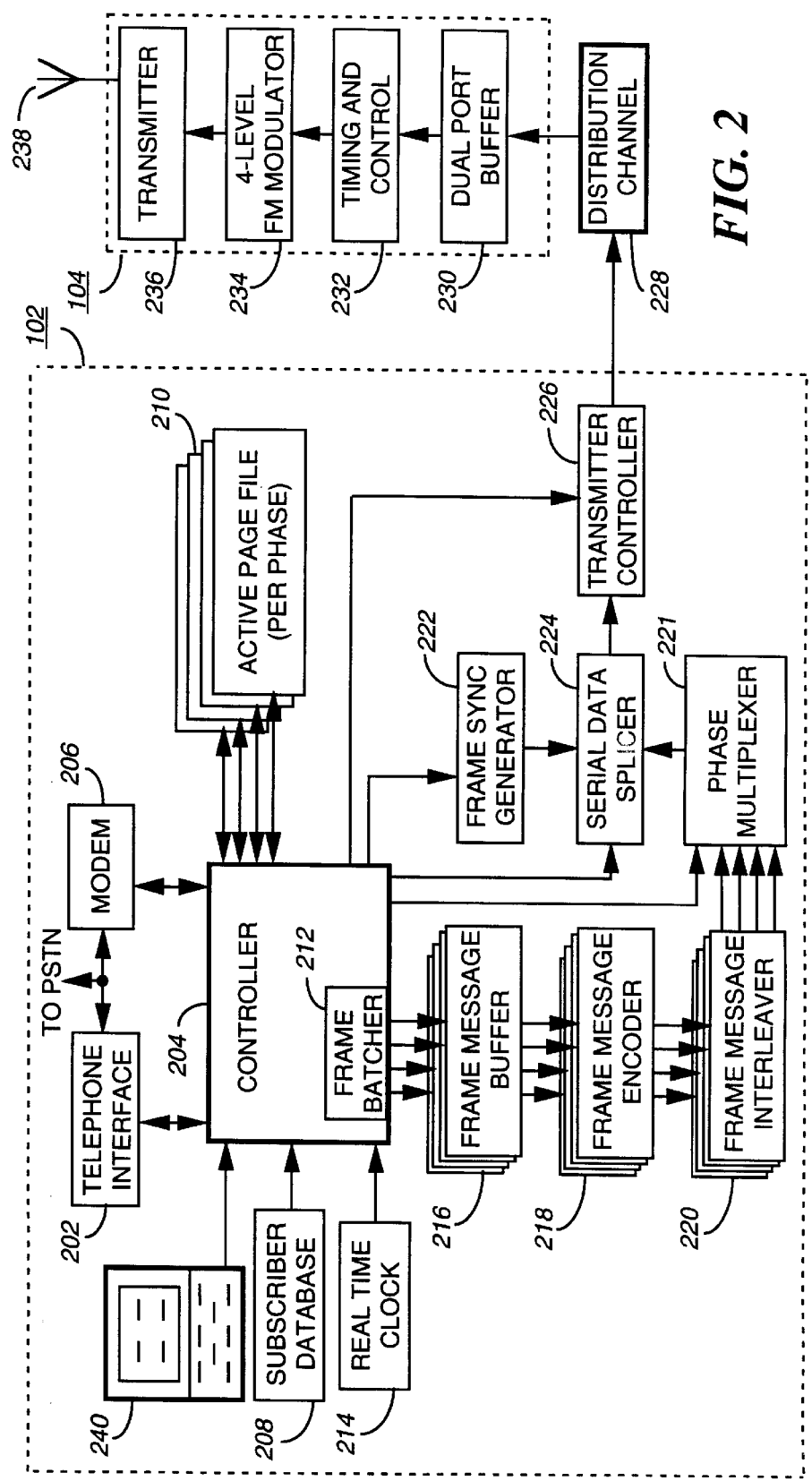

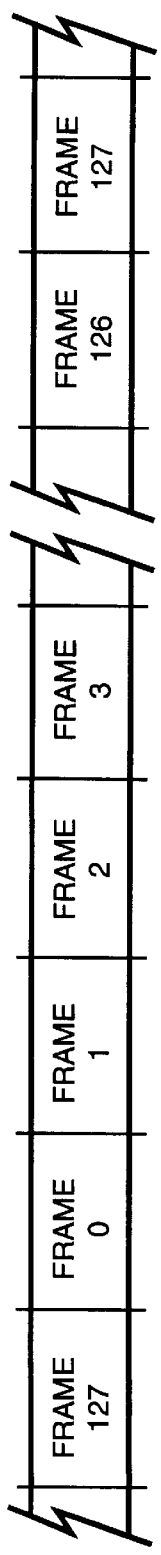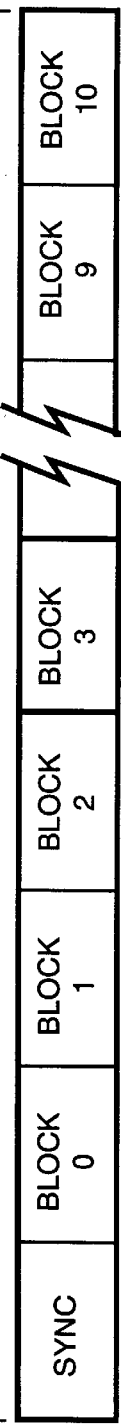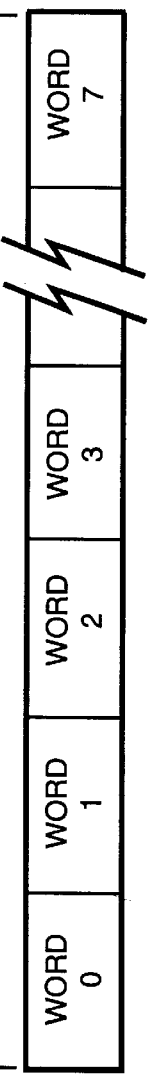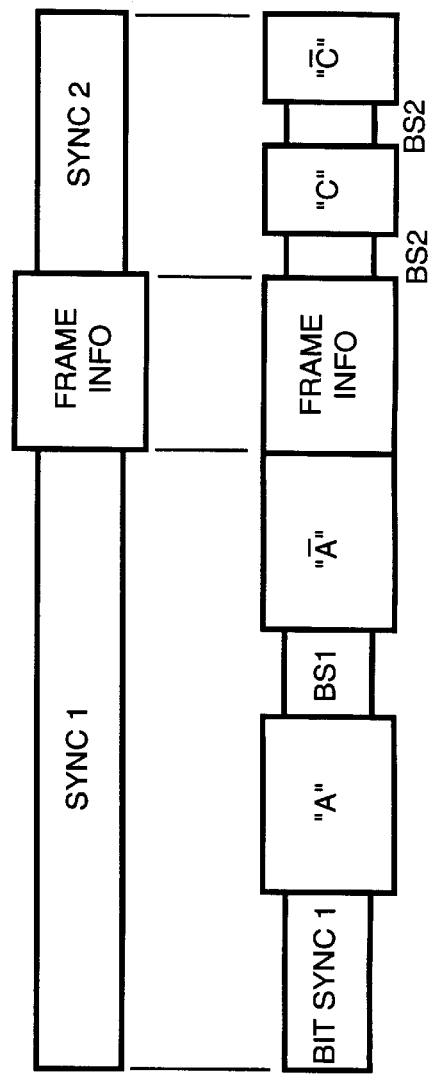
FIG. 3
FIG. 4
FIG. 5
FIG. 6
FIG. 7

PORTABLE 2-WAY WIRELESS FINANCIAL MESSAGING UNIT

FIELD OF THE INVENTION

This invention relates in general to selective call signalling systems and more particularly to a selective call signalling system that facilitates secure financial transactions over a wireless network using a portable 2-way wireless financial messaging unit.

BACKGROUND OF THE INVENTION

In conventional selective call signaling systems, a user or originator may send a message to a subscriber unit (e.g., selective call receiver), the message comprising an address associated with the subscriber unit, and data. The data may be in one or more forms such as numeric digits representing a phone number, alphanumeric characters representing a readable text message, or possibly a multimedia message comprising audio and graphical information. Typically, this form of messaging was sufficient to convey information between individuals or services relating to their business, special interests, whereabouts, general scheduling, or time critical appointments. However, because of society's increased need for information when a person is mobile, a solution must be found that allows an individual to perform personal or business transactions, as well as keeping informed of personal events, contacts, and business information.

Considering conventional wireless systems including both cellular and paging applications, there are significant problems that must be solved before reliable and private personal or business transactions can be implemented. Because of the advancement of the engineering sciences, particularly in the areas of wireless communications and computer science, it has become relatively easy for a "hacker" to monitor both the address and data broadcast to the selective call receiver. This unwanted monitoring or eavesdropping poses a problem to potential users of wireless communication systems in that their personal data may be exposed to unauthorized individuals, thus creating an unnecessary risk for both parties if confidential information is broadcast. Moreover, if the information contains clear-text data representing a personal address, serial number, Personal Identification Number (PIN) or the like, an unscrupulous party monitoring the data stream could gain access to an individual's personal accounts or pirate the address to clone an unauthorized communication device. The theft of service or confidential information in this manner is probably the most daunting issue facing communication equipment manufacturers and service providers today and in the future. The interest in securing data contained in broadcasts is especially keen in the area of electronic financial transactions. To expose for capture, the clear text data contained in a financial transaction invites, and will surely result, in a theft of funds or fraud against an individual.

Thus, what is needed is wireless messaging system that allows an originator to communicate a secure message between a subscriber unit and the originator, and authenticate the secure message, without exposing the content or meaning of the message.

SUMMARY OF THE INVENTION

Briefly, according to the invention, there is provided a method and apparatus for sending data comprising secure financial transactions over existing paging infrastructure equipment, using paging protocols such as FLEX®, a registered United States trademark of Motorola, Inc., POCSAG (Post Office Code Standardisation Advisory Group), or the like.

A first aspect of the invention involves realizing hardware that implements a method for overlaying secure messaging on an existing paging infrastructure. The existing paging infrastructure comprises a paging terminal that includes a paging encoder for processing received messages and their corresponding destination requests. The paging terminal generates a messaging queue of selective call messages comprising the received messages and their corresponding selective call address(es), as determined from the corresponding destination requests. Distribution of the selective call messages in the messaging queue is handled by the paging terminal which dispatches messages to at least one base station (e.g., transmitter, antenna, and receiver) for communication between the base station and the subscriber unit(s) or pagers.

A second aspect of the invention involves the inclusion of a cryptographic engine in the paging terminal for selectively ciphering, deciphering, signing, and verifying the authenticity of messages received from both an originator and from the subscriber unit or pager.

A third aspect of the invention involves the subscriber unit or pager that is equipped with a special security module that can process cryptographic information contained in the selective call messages to verify their authenticity extract the ciphered data, and return ciphered responses or acknowledgments as necessary, to authenticate and confirm reception of the secure message.

A fourth aspect of the invention involves the subscriber unit or pager being equipped with a primary and possibly a secondary apparatus for communicating both inbound and outbound messages. The primary apparatus comprises a conventional radio frequency receiver and optionally a conventional radio frequency transmitter. The secondary apparatus comprises an optical receiver and optionally an optical transmitter. Alternatively, the secondary apparatus may further comprise one or more acoustic or other electromagnetic transducers and associated circuitry implementing a uni- or bidirectional communication link between the subscriber unit or pager and the originator.

A fifth aspect of the invention involves the subscriber unit or pager including a single, predetermined account identifier corresponding with at least one of an electronic cash or funds storage card, debit card, credit card, or bank account.

A sixth aspect of the invention involves the subscriber unit or pager including multiple predetermined account identifiers corresponding with at least two of the following: electronic cash or funds storage card, debit card, credit card, or bank account.

A seventh aspect of the invention involves the cryptographic engine in the paging terminal and the security module in the subscriber unit or pager accommodating a plurality of cryptographic procedures. These cryptographic procedures comprise both private and public key systems, as appropriate. One such private key system is the Data Encryption Standard (DES) using the ANSI X3.92 DES algorithm in CBC mode. Similarly, a first public key system is RSA (invented by Rivest, Shamir, and Adleman), a cryptographic procedure based on sub-exponential one-way functions implemented using modulo n integer multiplication and exponentation. A second public key system uses elliptic curve technology, a cryptographic procedure based on highly non- linear exponential one-way functions implemented over finite fields.

An eight aspect of the invention involves initiating a wireless transaction from the subscriber unit or pager, the wireless transaction relating to at least one of the electronic cash or funds storage card, debit card, credit card, or bank account.

A ninth aspect of the invention involves a user selected personal identification number that is programmed into the subscriber unit or pager for protecting financial accounts or funds loaded in the subscriber unit or pager.

A tenth aspect of the invention involves a user selected personal identification number that is programmed into the Smart Card via the subscriber unit or pager, thus disabling access to any features of the protected Smart Card unless subsequently accessed or reprogrammed by the subscriber unit or pager.

An eleventh aspect of the invention involves authenticating the an authorized subscriber unit or pager as a communication agent for the wireless financial transaction, and selectively disallowing any financial transactions directed to accounts belonging to or controlled by the authorized subscriber unit or pager when an inbound or outbound financial transaction is communicated between an issuer and an unauthorized subscriber unit or pager, and in the alternative, preventing fund transfers or credit transactions that exceed a predetermined limit set either by an authorized user or a regulator such as a bank, a credit card issuer or the like.

BRIEF DESCRIPTION OF THE DRAWINGS

FIG. 1 is an electrical block diagram of a data transmission system for use in accordance with the preferred embodiment of the present invention.

FIG. 2 is an electrical block diagram of a terminal for processing and transmitting message information in accordance with the preferred embodiment of the present invention.

FIGS. 3–5 are timing diagrams illustrating the transmission format of the signaling protocol utilized in accordance with the preferred embodiment of the present invention.

FIGS. 6 and 7 are timing diagrams illustrating the synchronization signals utilized in accordance with the preferred embodiment of the present invention.

DESCRIPTION OF A PREFERRED EMBODIMENT

Figure 8:
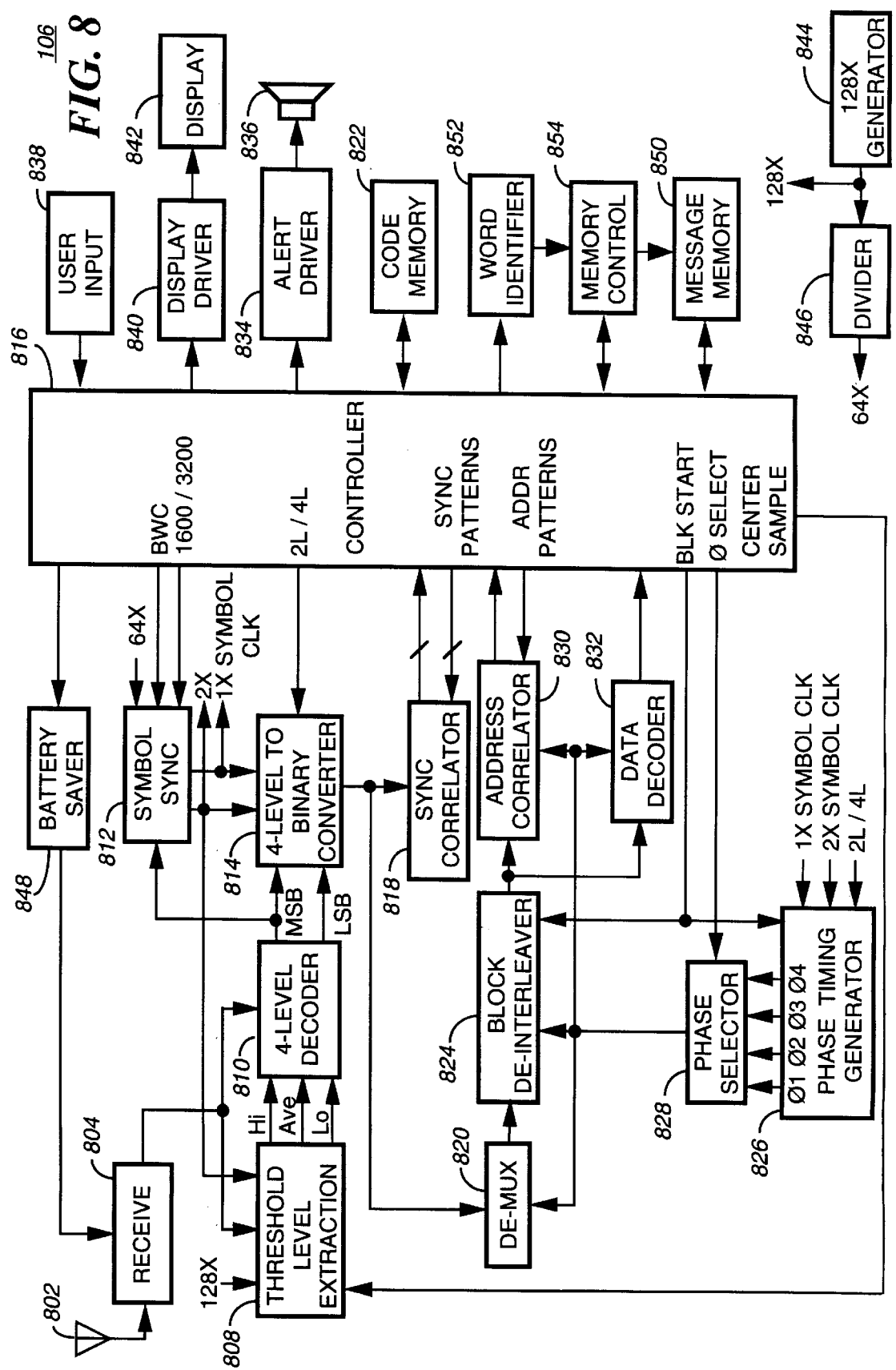
FIG. 8 is an electrical block diagram of a financial messaging unit in accordance with the preferred embodiment of the present invention.

Referring to FIG. 1, an electrical block diagram illustrates a data transmission system 100, such as a paging system, for use in accordance with the preferred embodiment of the present invention. In the data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104 preferably simulcast transmit the message information to financial messaging units 106. Processing of the numeric and alphanumeric information by the paging terminal 102, and the protocol utilized for the transmission of the messages is described below.

Referring to FIG. 2, an electrical block diagram illustrates the paging terminal 102 utilized for processing and controlling the transmission of the message information in accordance with the preferred embodiment of the present invention. Short messages, such as tone-only and numeric messages which can be readily entered using a Touch-Tone™ telephone are coupled to the paging terminal 102 through a telephone interface 202 in a manner well known in the art. Longer messages, such as alphanumeric messages which require the use of a data entry device are coupled to the paging terminal 102 through a modem 206 using any of a number of well known modem transmission protocols. When a call to place a message is received, a controller 204 handles the processing of the message. The controller 204 is preferably a microcomputer, such as a MC680x0 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to such information as addresses assigned to the financial messaging unit, message type associated with the address, and information related to the status of the financial messaging unit, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber database 208 also includes such information as to what transmission frame and to what transmission phase the financial messaging unit is assigned, as will be described in further detail below. The received message is stored in an active page file 210 which stores the messages in queues according to the transmission phase assigned to the financial messaging unit. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission (all of which is referred to as message related information), and then batched into frames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message codewords required for transmission, as will be described below. The encoded address and message codewords are ordered into blocks and then coupled to a block interleaver 220 which interleaves preferably eight codewords at a time to form interleaved information blocks for transmission in a manner well known in the art. The interleaved codewords contained in the interleaved information blocks produced by each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

Referring to FIGS. 3, 4 and 5, the timing diagrams illustrate the transmission format of the signaling protocol utilized in accordance with the preferred embodiment of the present invention. This signalling protocol is commonly referred to as Motorola's FLEX selective call signalling protocol. As shown in FIG. 3, the signaling protocol enables message transmission to financial messaging units, such as pagers, assigned to one or more of 128 frames which are labeled frame 0 through frame 127. It then will be appreciated that the actual number of frames provided within the signaling protocol can be greater or less than described above. The greater the number of frames utilized, the greater the battery life that may be provided to the financial messaging units operating within the system. The fewer the number of frames utilized, the more often messages can be queued and delivered to the financial messaging units assigned to any particular frame, thereby reducing the latency, or time required to deliver messages.

As shown in FIG. 4, the frames comprise a synchronization codeword (sync) followed preferably by eleven blocks of message information (information blocks) which are labeled block 0 through block 10. As shown in FIG. 5., each block of message information comprises preferably eight address, control or data codewords which are labeled word 0 through word 7 for each phase. Consequently, each phase in a frame allows the transmission of up to eighty-eight address, control and data codewords. The address, control and data codewords preferably comprise two sets, a set first relating to a vector field comprising a short address vector, a long address vector, a first message word, and a null word, and a second set relating to a message field comprising a message word and a null word.

The address, control, and data or message codewords are preferably 31,21 BCH codewords with an added thirty-second even parity bit which provides an extra bit of distance to the codeword set. It will be appreciated that other codewords, such as a 23,12 Golay codeword could be utilized as well. Unlike the well known POCSAG signaling protocol which provides address and data codewords which utilize the first codeword bit to define the codeword type, as either address or data, no such distinction is provided for the address and data codewords in the FLEX signaling protocol utilized with the preferred embodiment of the present invention. Rather, address and data codewords are defined by their position within the individual frames.

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information codeword (frame info) and a second synchronization codeword (sync 2). As shown in FIG. 7, the first synchronization codeword comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH codewords which are predefined to provide high codeword correlation reliability, and which are also used to indicate the data bit rate at which addresses and messages are transmitted. Table 1 defines the data bit rates which are used in conjunction with the signaling protocol.

TABLE 1

| Bit Rate | "A" Value |
|---|---|
| 1600 bps | A1 and A1 bar |
| 3200 bps | A2 and A2 bar |
| 6400 bps | A3 and A3 bar |
| Not defined | A4 and A4 bar |

As shown in Table 1, three data bit rates are predefined for address and message transmission, although it will be appreciated that more or less data bit rates can be predefined as well, depending upon the system requirements.

The frame information codeword is preferably a single 32,21 BCH codeword which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the financial messaging unit to obtain "fine" bit and frame synchronization at the frame transmission data bit rate.

In summary the signaling protocol utilized with the preferred embodiment of the present invention comprises 128 frames which include a predetermined synchronization code followed by eleven information blocks which comprise eight address, control or message codewords per phase. The synchronization code enables identification of the data transmission rate, and insures synchronization by the financial messaging unit with the data codewords transmitted at the various transmission rates.

FIG. 8 is an electrical block diagram of the financial messaging unit 106 in accordance with the preferred embodiment of the present invention. The heart of the financial messaging unit 106 is a controller 816, which is preferably implemented using a low power MC68HC0x microcomputer, such as manufactured by Motorola, Inc., or the like. The microcomputer controller, hereinafter call the controller 816, receives and processes inputs from a number of peripheral circuits, as shown in FIG. 8, and controls the operation and interaction of the peripheral circuits using software subroutines. The use of a microcomputer controller for processing and control functions (e.g., as a function controller) is well known to one of ordinary skill in the art.

The financial messaging unit 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a threshold level extraction circuit 808, and to an input of a 4-level decoder 810.

Operation of the threshold level extraction circuit 808, 4-level decoder 810, symbol synchronizer 812, 4-level to binary converter 814, synchronization codeword correlator 818, and phase timing generator (data recovery timing circuit) 826 depicted in the financial messaging unit of FIG. 8 is best understood with reference to U.S. Pat. No. 5,282, 205 entitled "Data Communication Terminal Providing Variable Length Message Carry-On And Method Therefor," issued to Kuznicki et al., assigned to Motorola, Inc., the teachings of which are incorporated herein by reference thereto.

Again referring to FIG. 8, the threshold level extraction circuit 808 comprises two clocked level detector circuits (not shown) which have as inputs the recovered data signal. Preferably, signal states of 17%, 50% and 83%, are utilized to enable decoding the 4-level data signals presented to the threshold level extraction circuit 808.

When power is initially applied to the receiver portion, as when the financial messaging unit is first turned on, a clock rate selector is preset through a control input (center sample) to select a 128× clock, i.e. a clock having a frequency equivalent to 128 times the slowest data bit rate, which as described above is 1600 bps. The 128× clock is generated by 128× clock generator 844, as shown in FIG. 8, which is preferably a crystal controlled oscillator operating at 204.8 KHz (kilohertz). The output of the 128× clock generator 844 couples to an input of frequency divider 846 which divides the output frequency by two to generate a 64× clock at 102.4 KHz. The 128× clock allows the level detectors to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (center sample) to enable selection of a 1× symbol clock which is generated by symbol synchronizer 812 as shown in FIG. 8.

The 4-level decoder 810 preferably operates using three voltage comparators and a symbol decoder. The recovered data signal is coupled to an input of the three comparators having thresholds corresponding with normalized signal states of 17%, 50% and 83%. The resulting system effectively recovers the demodulated 2- or 4-level FSK information signal by coupling the recovered data signal to the second input of an 83% comparator, the second input of a 50% comparator, and the second input of a 17% comparator. The outputs of the three comparators corresponding with the low (Lo), average (Avg) and high (Hi) threshold output signal values are coupled to inputs of a symbol decoder. The symbol decoder then decodes the inputs according to Table 2.

TABLE 2

| Threshold | | | Output | |
|---|---|---|---|---|
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} >$ | $RC_{in} >$ | 1 | 1 |
| $RC_{in} >$ | $RC_{in} >$ | $RC_{in} >$ | 1 | 0 |

As shown in Table 2, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

The symbol synchronizer 812 uses a 64× clock at 102.4 KHz which is generated by frequency divider 846, that is coupled to an input of a 32× rate selector (not shown). The 32× rate selector is preferably a divider which provides selective division by 1 or 2 to generate a sample clock which is thirty-two times the symbol transmission rate. A control signal (1600/3200) is coupled to a second input of the 32× rate selector, and is used to select the sample clock rate for symbol transmission rates of 1600 and 3200 symbols per second. The selected sample clock is coupled to an input of 32× data oversampler (not shown) which samples the recovered data signal (MSB) at thirty-two samples per symbol. The symbol samples are coupled to an input of a data edge detector (not shown) which generates an output pulse when a symbol edge is detected. The sample clock is also coupled to an input of a divide-by-16/32 circuit (not shown) which is utilized to generate 1× and 2× symbol clocks synchronized to the recovered data signal. The divided-by-16/32 circuit is preferably an up/down counter. When the data edge detector detects a symbol edge, a pulse is generated which is gated by an AND gate with the current count of divide-by-16/32 circuit. Concurrently, a pulse is generated by the data edge detector which is also coupled to an input of the divide-by-16/32 circuit. When the pulse coupled to the input of the AND gate arrives before the generation of a count of thirty-two by the divide-by-16/32 circuit, the output generated by the AND gate causes the count of divide-by-16/32 circuit to be advanced by one count in response to the pulse which is coupled to the input of divide-by-16/32 circuit from the data edge detector, and when the pulse coupled to the input of the AND gate arrives after the generation of a count of thirty-two by the divide-by-16/32 circuit, the output generated by the AND gate causes the count of divide-by-16/32 circuit to be retarded by one count in response to the pulse which is coupled to the input of divide-by-16/32 circuit from the data edge detector, thereby enabling the synchronization of the 1× and 2× symbol clocks with the recovered data signal. The symbol clock rates generated are best understood from Table 3 below.

TABLE 3

| Input Clock (Relative) | Control Input (SPS) | Rate Selector Divide Ratio | Rate Selector Output | 2X Symbol Clock (BPS) | 1X Symbol Clock (BPS) |
| --- | --- | --- | --- | --- | --- |
| 64X | 1600 | by 2 | 32X | 3200 | 1600 |
| 64X | 3200 | by 1 | 64X | 6400 | 3200 |

As shown in the table above, the 1× and 2× symbol clocks are generated 1600, 3200 and 6400 bits per second and are synchronized with the recovered data signal.

The 4-level binary converter 814 couples the 1× symbol clock to a first clock input of a clock rate selector (not shown). A 2× symbol clock is coupled to a second clock input of the clock rate selector. The symbol output signals (MSB, LSB) are coupled to inputs of an input data selector (not shown). A selector signal (2L/4L) is coupled to a selector input of the clock rate selector and the selector input of the input data selector, and provides control of the conversion of the symbol output signals as either 2-level FSK data, or 4-level FSK data. When the 2-level FSK data conversion (2L) is selected, only the MSB output is selected which is coupled to the input of a conventional parallel to serial converter (not shown). The 1× clock input is selected by clock rate selector which results in a single bit binary data stream to be generated at the output of the parallel to serial converter. When the 4-level FSK data conversion (4L) is selected, both the LSB and MSB outputs are selected which are coupled to the inputs of the parallel to serial converter. The 2× clock input is selected by clock rate selector which results in a serial two bit binary data stream to be generated at 2× the symbol rate, which is provided at the output of the parallel to serial converter.

Referring again to FIG. 8, the serial binary data stream generated by the 4-level to binary converter 814 is coupled to inputs of a synchronization codeword correlator 818 and a demultiplexer 820. Predetermined "A" codeword synchronization patterns are recovered by the controller 816 from a code memory 822 and are coupled to an "A" codeword correlator (not shown). When the synchronization pattern received matches one of the predetermined "A" codeword synchronization patterns within an acceptable margin of error, an "A" or "A-bar" output is generated and is coupled to controller 816. The particular "A" or "A-bar" codeword synchronization pattern correlated provides frame synchronization to the start of the frame ID codeword, and also defines the data bit rate of the message to follow, as was previously described.

The serial binary data stream is also coupled to an input of the frame codeword decoder (not shown) which decodes the frame codeword and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization codeword, as described above, and which continues to be supplied to enable processing of the remainder of the synchronization code. The controller 816 compares the frame number currently being received with a list of assigned frame numbers stored in code memory 822. Should the currently received frame number differ from an assigned frame numbers, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

A predetermined "C" codeword synchronization pattern is recovered by the controller 816 from a code memory 822 and is coupled to a "C" codeword correlator (not shown). When the synchronization pattern received matches the predetermined "C" codeword synchronization pattern with an acceptable margin of error, a "C" or "C-bar" output is generated which is coupled to controller 816. The particular "C" or "C-bar" synchronization codeword correlated provides "fine" frame synchronization to the start of the data portion of the frame.

The start of the actual data portion is established by the controller 816 generating a block start signal (Blk Start) which is coupled to inputs of a codeword de-interleaver 824 and a data recovery timing circuit 826. A control signal (2L/4L) is coupled to an input of clock rate selector (not shown) which selects either 1× or 2× symbol clock inputs. The selected symbol clock is coupled to the input of a phase generator (not shown) which is preferably a clocked ring counter which is clocked to generate four phase output signals (Ø1–Ø4). A block start signal is also coupled to an input of the phase generator, and is used to hold the ring counter in a predetermined phase until the actual decoding of the message information is to begin. When the block start signal releases the phase generator, it begins generating clocked phase signals which are synchronized with the incoming message symbols.

The clocked phase signal outputs are then coupled to inputs of a phase selector 828. During operation, the controller 816 recovers from the code memory 822, the transmission phase number to which the financial messaging unit is assigned. The phase number is transferred to the phase select output (Ø Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. In a first embodiment, the de-interleaver uses an 8×32 bit array which de-interleaves eight 32 bit interleaved address, control or message codewords, corresponding to one transmitted information block. The de-interleaved address codewords are coupled to the input of address correlator 830. The controller 816 recovers the address patterns assigned to the financial messaging unit, and couples the patterns to a second input of the address correlator. When any of the de-interleaved address codewords matches any of the address patterns assigned to the financial messaging unit within an acceptable margin of error (e.g., the number of bit errors correctable according to the codeword structure selected), the message information and corresponding information associated with the address (e.g., the information representing the broadcast and received selective call signalling message, which was previously defined as message related information) is then decoded by the data decoder 832 and stored in a message memory 850.

Following the detection of an address associated with the financial messaging unit, the message information is coupled to the input of data decoder 832 which decodes the encoded message information into preferably a BCD or ASCII format suitable for storage and subsequent display.

Alternatively, the software based signal processor may be replaced with a hardware equivalent signal processor that recovers the address patterns assigned to the financial messaging unit, and the message related information. Following, or prior to detection of an address associated with the financial messaging unit, the message information and corresponding information associated with the address may be stored directly in the message memory 850. Operation in this manner allows later decoding of the actual message information, e.g., that encoded message information that decodes into a BCD, ASCII, or multimedia format suitable for subsequent presentation. However, in performing direct storage, the memory must be structured in a manner that allows efficient, high speed placement of the message information and corresponding information associated with the address. Additionally, to facilitate the direct storage of message information and corresponding information associated with the address in the message memory 850, a codeword identifier 852 examines the received codeword to assign a type identifier to the codeword in response to the codeword belonging to one of a set comprising a vector field and a set comprising a message field. After determining the type identifier, a memory controller 854 operates to store the type identifier in a second memory region within the memory corresponding with the codeword. The above memory structure and operation of the de-interleaved information memory storage device comprising the message memory 850, the codeword identifier 852, and the memory controller 854, are more fully discussed in the patents incorporated below.

Following the storage of the message related information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

The stored message information can be recalled by the user using the user input controls 838 whereupon the controller 816 recovers the message information from memory, and provides the message information to a display driver 840 for presentation on a display 842, such as an LCD display.

In addition to the preceding description, the systems previously discussed in reference to FIGS. 1, 2, 7 and 8, and protocol previously discussed in reference to FIGS. 3, 4 and 5 may be more fully understood in view of the following U.S. Pat. No. 5,168,493 entitled "Time Division Multiplexed Selective Call System" issued to Nelson et al., U.S. Pat. No. 5,371,737 entitled "Selective Call Receiver For Receiving A Multiphase Multiplexed Signal" issued to Nelson et al., U.S. Pat. No. 5,128,665 entitled "Selective Call Signalling System" to DeLuca et al., and U.S. Pat. No. 5,325,088 entitled "Synchronous Selective Signalling System" to Willard et al., all of which are assigned to Motorola, Inc., and the teachings of which are incorporated herein by reference thereto.

Figure 9:
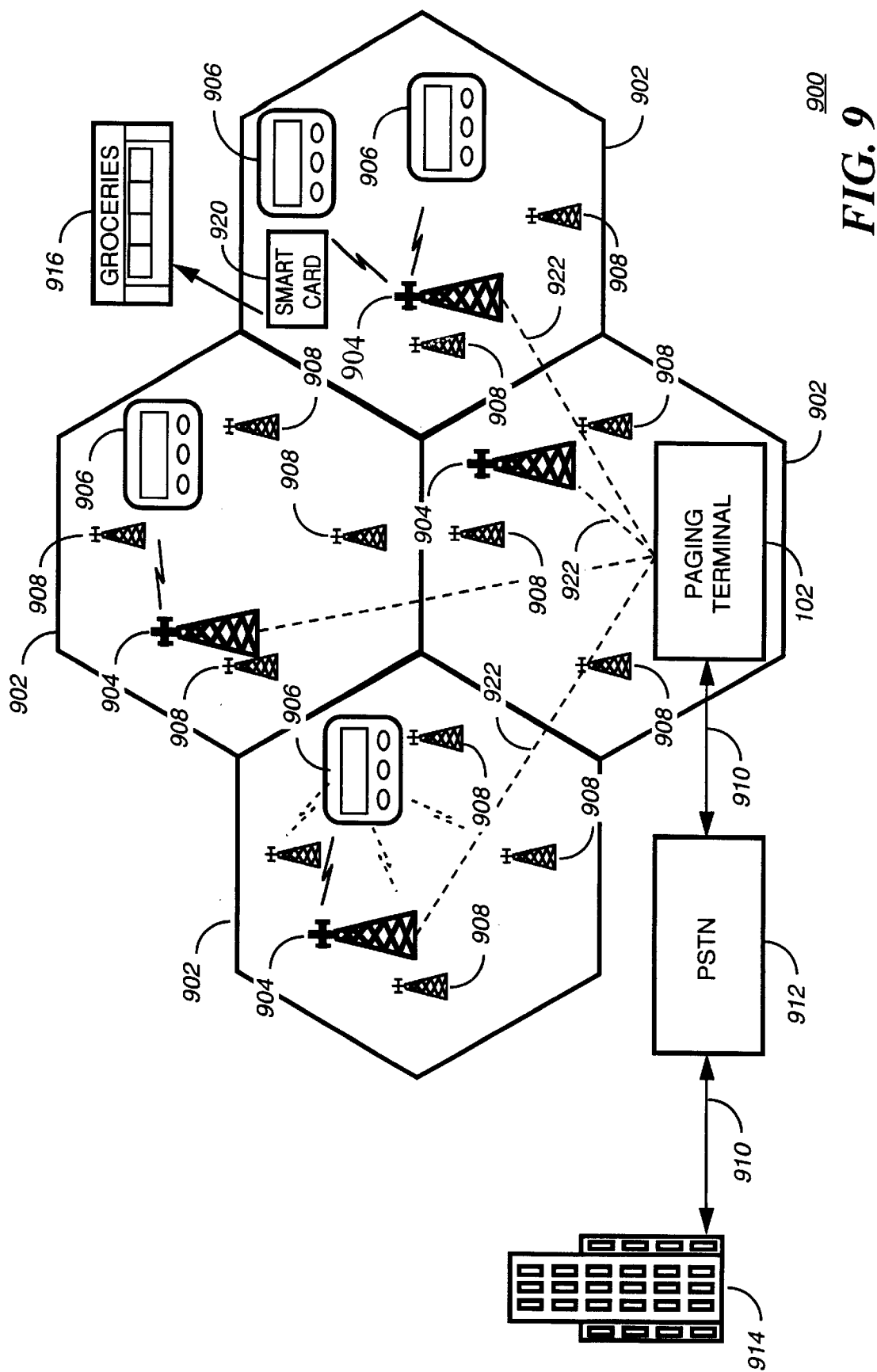
FIG. 9 is a diagram of a secure messaging system in accordance with the present invention.

Referring to FIG. 9, a diagram shows a secure messaging system 900 in accordance with the present invention.

The paging terminal 102 or wireless selective call signalling system controller, receives information comprising a selective call message request including a destination identifier and a secure financial transaction message. The information is typically coupled to the paging terminal 102 via a Public Switched Telephone Network (PSTN) 912 which serves to transport the information from a regulator 914 such as a bank, credit card issuer or the like. The PSTN 912 may be coupled to the paging terminal 102 and the regulator 914 using conventional phone lines 910 or possibly a high speed digital network, depending on the information bandwidth required for communicating financial transactions between the regulator 914 and a plurality of one financial messaging unit 906. Once coupled to the paging terminal 102, the information is formatted as one or more selective call messages and transferred 922 to at least one radio frequency transmitter 904 for broadcast to at least one financial messaging unit 906 located in any one of a number of communication zones 902. The financial messaging unit 906 may include an interface that couples unencrypted or encrypted information such as the secure financial transaction message to a conventional Smart Card 920 for effecting a financial transaction. Alternatively, the secure financial transaction message may be decoded and stored by the financial messaging unit 906 when the financial messaging unit 906 includes capabilities, e.g., cash load and reload and/or credit services, such as found in a Smart Card 920.

Two-way capability is provided for the financial messaging unit 906 using either a wired or a wireless return path. By way of example, the secure financial transaction message is received by the financial messaging unit 906 which decodes and decrypts a content of the secure financial transaction message that may represent a cash value token, credit, or debit amount. This message content is then stored by the financial messaging unit 906 pending confirmation of receipt and a subsequent release of funds or authorization of credit by the regulator. If the financial transaction value is high, the regulator will typically require an acknowledgment from the financial messaging unit 906 before the received token based funds are activated, or before a credit or debit transaction is allowed. However, if the financial transaction value is low, the regulator may not require an acknowledgment from the financial messaging unit 906 before the received token based funds are activated, or before a credit or debit transaction is allowed. In case of a low value transaction, the financial messaging unit 906 may only be required to reconcile its fund or credit capacity one a day, or week.

The secure messaging system illustrated in FIG. 9 allows wireless return or origination of secure financial transaction messages using a reverse or inbound channel received by distributed receiver sites 908. These sites are typically more dense that the outbound broadcast sites 904 since the transmitter power and antenna characteristics of the financial messaging unit 906 are significantly inferior to that of a dedicated radio frequency base station and wide area transmitter site 904. Thus, the size and weight of a financial messaging unit 906 is kept to a minimum, yielding a more ergonomic portable device with the value added function of not requiring a physical connection to effect financial transactions such as bank withdrawals, deposits, credit card payments, or purchases. Alternatively, the secure messaging system is adapted to accommodate lower power financial messaging unit 906 devices that might include additional means for implementing the return or origination of secure financial transaction messages using a reverse or inbound channel that is accessed at a point of sale 916 or at a bank 914. In these cases, the lower power financial messaging unit 906 could include an infrared or laser optical port, low power proximate magnetic inductive or electric capacitive port, or possibly an ultrasonic or audio band acoustic transducer port, all of which could couple signals between the lower power financial messaging unit 906 and a device such as a point of sale terminal, automated teller machine, or the like.

Several cryptographic methods are suitable for use with the present invention. The following definitions are useful in understanding the terminology associated with cryptography as applied to wired or wireless communications.

Certificate—Certificates are digital documents attesting to the binding of a public key to an individual or other entity. Certificates are issued by a Certification Authority (CA), which can be any trusted central administration willing to vouch for the identities of those to whom it issues certificates. A certificate is created when a CA signs a user's public key plus other identifying information, binding the user to their public key. Users present their certificate to other users to demonstrate the validity of their public keys.

Confidentiality—The result of keeping information secret from all but those who are authorized to see it. Confidentiality is also referred to as privacy.

Cryptographic Protocol—A distributed algorithm defined by a sequence of steps precisely specifying the actions required of two or more entities to achieve a specific security objective.

Data Integrity—The assurance that information has not been altered by unauthorized or unknown means.

Decryption—The process of transforming encrypted information (cipher text) into plain text.

DES (Data Encryption Standard)—A symmetric encryption cipher defined and endorsed by the U.S. government as an official standard. It is the most well-known and widely used cryptosystem in the world.

Diffie-Hellman—The Diffie-Hellman key agreement protocol provided the first practical solution to the key distribution problem by allowing parties to securely establish a shared secret key over an open channel. The security is based on the discrete log problem.

Digital Signature—A data string which associations a message (in digital form) with the originating entity. This cryptographic primitive is used to provide authentication, data integrity and non-repudiation.

Discrete Log Problem—The requirement to find the exponent x in the formula $y=g^x$ mod p. The discrete log problem is believed to be difficult and the hard direction of a one-way function.

Elliptic Curve Cryptosystem (ECC)—A public-key cryptosystem based on the discrete logarithm problem over elliptic curves. ECC provides the highest strength-per-bit of any public-key system, allowing the use of much smaller public-keys compared to other systems.

Encryption—The process of transforming plain text into cipher text for confidentiality or privacy.

Entity Authentication—The corroboration of the identity of an entity (e.g., a person, financial messaging unit, computer terminal, Smart Card 920, etc.).

Factoring—The act of splitting an integer into a set of smaller integers which, when multiplied together, form the original integer. RSA is based on the factoring of large prime numbers.

Information Security Functions—The processes of encryption and digital signatures which provide information security services. Also known as security primitives.

Information Security Services—The purpose of utilizing information security functions. Services include privacy or confidentiality, authentication, data integrity and non-repudiation.

Key—A value in the form of a data string used by information security functions to perform cryptographic computations.

Key Agreement—A key establishment technique in which a shared secret is derived by two or more parties as a function or information contributed by, or associated with, each of these such that no party can predetermine the resulting value.

Key Establishment—Any process whereby a shared secret key becomes available to two or more parties, for subsequent cryptographic use.

Key Management—The set of processes and mechanisms which support key establishment and the maintenance of ongoing keying relationships between parties.

Key Pair—The public key and private key of a user or entity in a public-key cryptosystem. Keys in a key pair are mathematically related by a hard one-way function.

Key Transport—A key establishment technique where one party creates or otherwise obtains a secret value and securely transfers it to the other party or parties.

Message Authentication—The corroboration of the source of information; also known as data original authentication.

Message Authentication Code (MAC)—A hash function which involves a secret key, and provides data original authentication and data integrity. The MAC is also referred to as a transaction authentication code, wherein a message may contain at least one transactions.

Non-repudiation—The prevention of the denial of previous commitments or actions. Non-repudiation is achieved using digital signatures.

Private Key—In a public-key system, it is that key in a key pair which is held by the individual entity and never revealed. It is preferable to embed the private key in a hardware platform as a measure to keep it hidden from unauthorized parties.

Public Key—In a public key system, it is that key in a key pair which is made public.

Public-Key Cryptography—A cryptographic system that uses different keys for encryption (e) and decryption (d), where (e) and (d) are mathematically linked. It is computationally infeasible to determine (d) from (e). Therefore, this system allows the distribution of the public key while keeping the private key secret. Public-key cryptography is the most important advancement in the field of cryptography in the last 2000 years.

RSA—A widely used public-key cryptosystem, named after its inventors R. Rivest, A. Shamir, and L. Adleman. The security of RSA is based on the intractability of the integer factorization problem.

Symmetric-Key Encryption—A cryptosystem in which for each associated encryption/decryption key pair, (e,d), it is computationally easy to determine d knowing only e, and to determine e from d. In most practical symmetric-key encryption schemes e=d. Although symmetric systems are efficient for bulk encryption of data, they pose significant key management problems. Consequently, symmetric-key and public-key systems are often combined in a system to take advantage of the benefits of each.

Asymmetric-Key Encryption—A cryptosystem in which for each party holds encryption/decryption key pairs with varying strength, e.g., a shorter key may be used in situations requiring less security, while a longer key is used in situations requiring greater security. As with symmetric- key encryption systems, asymmetric systems pose significant key management problems.

Verification—The process of confirming that a digital signature, and therefore an entity or a message, is authentic.

The following examples illustrate systems that may be used to implement a secure messaging system in accordance with the present invention.

Using ECC Algorithms, a secure signature with hash is generated based on the following information:

P is a generating point on the curve and has order n.
H is a secure hash algorithm such as SHA-1.
M is a bit string to be signed by an entity A
A has a private key a and a public key $Y_a=aP$.
To generate the signature, Entity A does the following:

1. Compute e=H (M) (e is an integer)
2. Generate a random integer k
3. Compute R=kP=(x,y)
4. Convert x to an integer.
5. Compute r=x+e mod n
6. Compute s=k−ar mod n.
7. The signature is (r,s).

Since R=kp is computed independently of the message M it could be pre-computed prior to signing M which occurs in steps (5) and (6). In this procedure, the time to hash and generate a random number is taken to be negligible in comparison with other operations performed. Finally, pre-computation of certain functions may be performed to speed up the computation of kP in step (3).

Any entity B can verify A's signature (r,s) on M by performing the following steps:

1. Obtain A's public key $Y_a=aP$.
2. Compute u=sP
3. Compute V=rYa
4. Compute u+v=(x',y')
5. Convert x' to an integer.
6. Compute e'=r−x' mod n.
7. Compute e=H(M) and verify that e'=e.

The following example illustrates encryption using an elliptic curve encryption scheme. Assume that Entity A has a private key a and public key Ya=aP where P is a generating point. Entity B encrypts bit string M to entity A using the following procedure:

1. B obtains A's public key $Y_a$
2. B generates random integer k.
3. B computes R=kP.
4. B computes $S=kY_a=(x,y)$
5. B computes $c_i=m_i \oplus f_i(x)$
6. B sends (R, $c_o$ ... $c_n$) to A.

Where $f_0(x)$=SHA-1 (x||0) and $f_i(x)$=SHA-1($f_{i-1}(x)$ ||x||i)

Alternatively, if RSA cryptography is used, the following definitions are pertinent:

n is the modulus.
d is the private key and the public exponent for entity A.
M is a bit string to be signed.

An RSA signature is generated by Entity A as follows:

1. Compute m=H(M), an integer less than n.
2. Compute s=$m^d$ mod n
3. The signature is s.

RSA signing as described above creates digital signatures with appendix. In contrast to the ECC signing discussed previously, no pre-computation is possible when using RSA. Note that the signing requires one exponentiation by the private exponent d.

Entity B can verify A's signature S on M using the following procedure:

1. Obtain A's public exponent e and modulus n.
2. Compute m*=$s^e$ mod n.
3. Compute m=H(M).
4. Verify that m*=m In RSA verification, one exponentiation by the public exponent e is required. e is preferably selected to be 64 random bits. Similarly, for RSA encryption, one exponentiation is required with a public exponent and the public exponent should be at least 64 bits long for minimum security.

In view of the preceding discussion, the remainder of the secure messaging system is described with reference to FIGS. 10–16.

Figure 10:
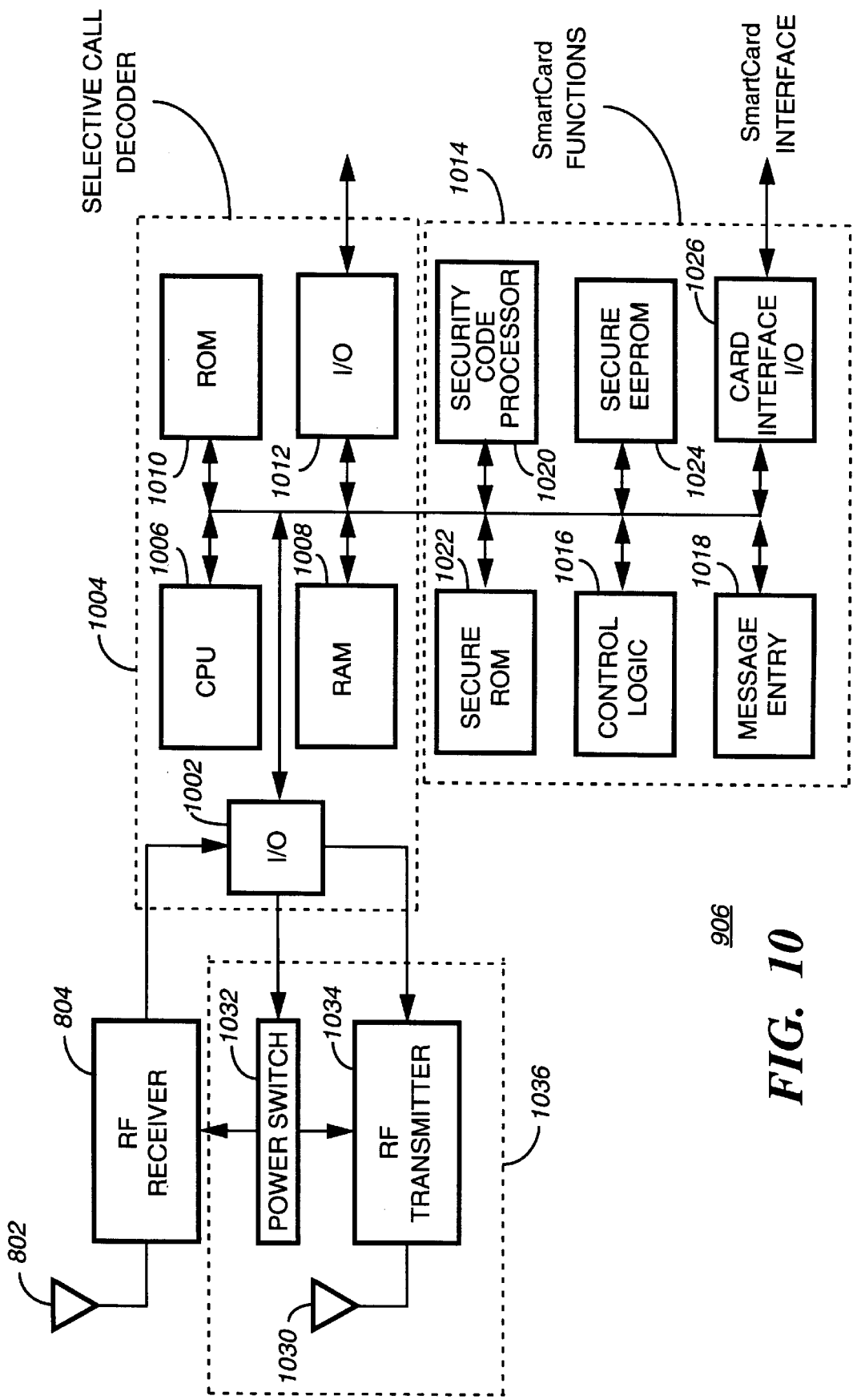
FIG. 10 is a high level block diagram of a financial messaging unit in accordance with the preferred embodiment of the present invention.

Referring to FIG. 10, the illustration shows a high level block diagram of a financial messaging unit 906 in accordance with the preferred embodiment of the present invention.

One possible embodiment of a financial messaging unit 906 is a conventional paging device and Smart Card 920 combination as shown in FIG. 10. Here, a mechanical slot and standard Smart Card connector are incorporated into the paging device's housing so that a Smart Card 920 can be inserted into the housing in a manner that establishes electrical contact between the card and the pager electronics. Alternatively, the electronics required to implement a Smart Card 920 are moved or integrated into the paging device so the pager functions as a true wireless Smart Card or wireless ATM.

Operationally, the incoming signal is captured by the antenna 802 coupled to the receiver 804 which detects and demodulates the signal, recovering any information as previously discussed with reference to FIG. 8. Alternatively, the financial messaging unit 906 contains a low power reverse channel transmitter 1034, power switch 1032, and transmit antenna 1030 for either responding to an outbound channel query or generating an inbound channel request. Instead of the portable transmitter 1034 (e.g., a low power radio frequency device) and its associated components, the alternative transmission block 1036 may contain either uni- or bi-directional communication transducers. Examples of such transducers are optical devices like lasers or light emitting diodes (LED), extremely low power magnetic field inductive or electric field capacitive structures (e.g., coils, transmission lines), or possibly acoustic transducers in the audio or ultrasonic range.

An input/output (I/O) switch 1002 serves to direct the incoming or outgoing radio frequency (RF) energy between the RF receiver 804, RF transmitter 1030 and a selective call decoder 1004. The selective call decoder 1004 comprises a main processor unit 1006, and its associated random access memory (RAM) 1008, read-only memory (ROM) 1010, and universal input/output (I/O) module 1012. The primary function of the selective call decoder 1004 is to detect and decode information contained in signalling intended for receipt by the financial messaging unit 906. Alternatively, in a 2-way implementation that includes the optional reverse channel transmitter block 1036, the selective call decoder 1004 may also function as an encoder to generate and deliver requests or messages to the regulator 914, a user, or other on-line system (not shown).

Additionally, the financial messaging unit 906 comprises a secure decoding or Smart Card function module 1014 that serves as a second financial transaction processor. This module comprises control logic 1016, a message entry device 1018, a security code processor 1020, a secure ROM 1022, a secure programmable read only memory (PROM) 1024, and a Smart Card input/output (I/O) module 1026.

Certain financial groups have proposed standards for effecting end-to-end transaction security in the land-line wired environment. The standards proposed for securing electronic financial transactions are based on a peer-to-peer closed loop system in which the sending party (e.g., a regulator or issuer such as a bank, or VISA™) generates a secure transaction that comprises a value amount and an authentication code. The secure transaction is communicated to a requesting party via a device such as an Automatic Teller Machine (ATM). In order to establish and complete a transaction, the requesting party inserts a Smart Card 920 into the ATM, enters an identification code, and requests a value to be placed in the Smart Card 920. The transaction processing system authenticates the Smart Card 920, the requesting party's financial status (e.g., account balance, credit availability, etc.) and either completes or denies the transaction.

Accordingly, in view of the above requirements, the control logic 1016 operates to govern operation of the components associated with the Smart Card function module 1014 to implement and maintain end-to-end security in a secure financial transaction message. The control logic 1016 insures that any contents associated with the secure financial transaction message are kept in their encrypted state from a regulator 914 until they are actually decrypted by the Smart Card function module 1014 or an associated Smart Card 920. Therefore, sensitive information such as a private encryption key, cash load values, credit or bank account numbers, or the like, are stored in the secure PROM 1024. Similarly, the secure ROM 1022 may store processing routines that decrypt and encrypt information exchanged between the Smart Card function module 1014 and a regulator 914, merchant 916, or another Smart Card 920.

The message entry device 1018 allows a user to initiate a cash load request, cash transaction, credit transaction, or the like. Typically, a user might enter a request using a keyboard, a voice activated recognition device, a touch-sensitive device (e.g., screen or pad), or other convenient data entry device. In the present invention, a user may request transaction based information be communicated with the financial messaging unit 906, stored in the financial messaging unit 906 for later transfer to the Smart Card 920, or passed directly to the Smart Card 920. In this way, the financial messaging unit 906 acts like a portable Automatic Teller Machine (ATM), allowing a user to effect financial transactions without actually visiting a physical ATM.

In the case where the financial messaging unit 906 acts like a portable ATM with origination capability, the Smart Card function module 1014 operates as a second secure message generator coupled to the financial messaging unit to create a financial transaction request. Once created, a portable transmitter 1034 coupled to the secure message generator operates to broadcast the financial transaction request to a selective call message processor 1104. A receiver (received processor (FIG. 12)) 1204 coupled to the selective call message processor 1104 operates to receive and couple the financial transaction request to the selective call message processor 1104. In this way, the financial messaging unit 906 can perform financial transactions without requiring a physical connection to a land-line hard wired network or PSTN.

With regard to the implementation of a radio frequency enabled reverse channel financial messaging unit 906 as discussed herein, the invention preferably operates using the Motorola REFLEX™ 2-way wireless paging system infrastructure and protocol which is described in detail in the following documents: U.S. Pat. No. 5,475,863, issued Dec. 12, 1995 to Simpson et al. and titled "Method and Apparatus for Delivering Messages to Portable Communication Units in a Radio Communication System"; U.S. Pat. No. 5,712,624, issued Jan. 27, 1998 to Ayerst et al. and titled "Method and Apparatus for Optimizing Receiver Synchronization in a Radio Communication System"; U.S. Pat. No. 5,521,926 issued May 28, 1996 to Ayerst et al. and titled "Method And Apparatus for Improved Message Reception at a Fixed System Receiver"; U.S. Pat. No. 5,638,369, issued Jun. 10, 1997 to Ayerst et al. and titled "Method and Apparatus for Inbound Channel Selection in a Communication System"; and U.S. Pat. No. 5,737,691, issued Apr. 7, 1998 to Wang et al. and titled "System and Method for Allocating Frequency Channels in a Two-Way Messaging Network", all of which are assigned to the assignee of the present invention, and all of which are incorporated by reference herein.

It should be appreciated that the use of the instant invention in other 2-way communication systems such as cellular and radio packet data systems is contemplated.

Certain financial groups have proposed standards for effecting end-to-end transaction security in the land-line wired environment. The standards proposed for securing electronic financial transactions are based on a peer-to-peer closed loop system in which the sending party (e.g., a regulator or issuer such as a bank, or VISA™) generates a secure transaction that comprises a value amount and an authentication code. The secure transaction is communicated to a requesting party via a device such as an Automatic Teller Machine (ATM). In order to establish an complete a transaction, the requesting party inserts a Smart Card 920 into the ATM, enters an identification code, and requests a value to be placed in the Smart Card 920. The transaction processing system authenticates the Smart Card 920, the requesting party's financial status (e.g., account balance credit availability, etc.) and either completes or denies the transaction.

In a broader application, the financial messaging unit 906 may be adapted to communicate, sensitive messages or data, as well as electronic funds transfer information can be securely transferred to the intended recipient device via a paging channel or the like.

Figure 11:
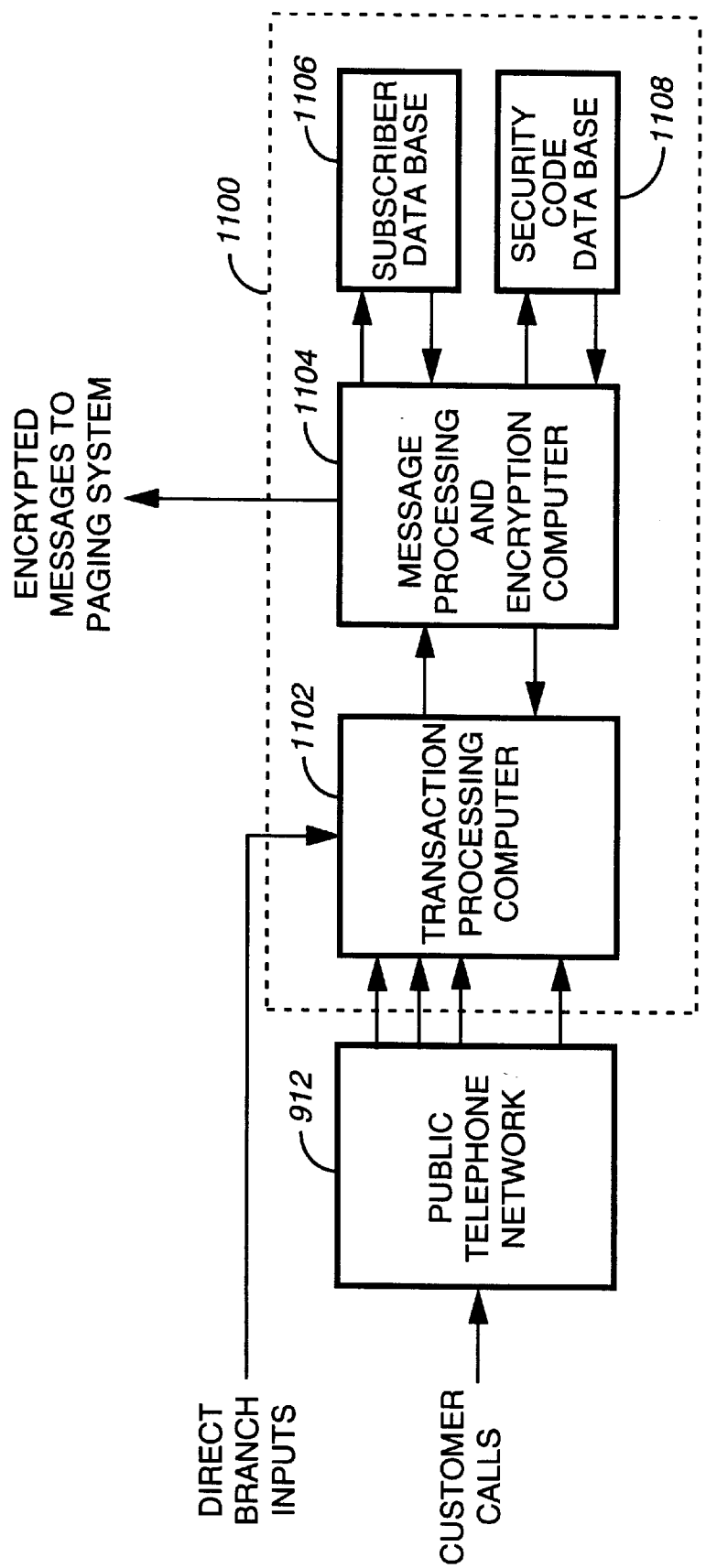
FIG. 11 is a block diagram of the message composition and encryption equipment that could be used on the premises of a financial institution to send secure electronic funds transfer authorizations to financial messaging units via a paging channel.

Referring to FIG. 11, the block diagram illustrates message composition and encryption equipment that could be used on the premises of a financial institution to send secure electronic funds transfer authorizations to financial messaging units via a paging channel or the like.

Specifically, both direct branch and customer calls are received by a first financial transaction processor 1100 comprising a transaction processing computer 1102, a message processing and encryption computer 1104 or selective call message processor that operates as a first secure message generator, a first secure message decoder, and a selective call message distributor, all being functions of the selective call message processor 1104, a subscriber database 1106, and a security code database 1108. The transaction processing computer 1102 receives financial transaction requests and communicates with the message and encryption processor 1104 to generate and encrypt secure financial transaction message based on information contained in the security code database 1108 corresponding with the requester and the transaction type. The message processing and encryption computer 1104 also determines a destination identifier from information contained in the subscriber database 1106, which allows the selective call message distributor to communicate the destination identifier and its corresponding secure financial transaction message to a selective call transmission service 904. The destination identifier may correspond with a conventional paging address, a cellular telephone address, or any other address that uniquely identifies a destination associated with the secure financial transaction message.

The message composition and encryption equipment illustrated in FIG. 11 would typically be used on the premises of a financial institution to send secure electronic funds transfer authorizations to financial messaging units 906 (e.g., "wireless ATM" devices) via a conventional paging channel or the like. In the following examples, the transaction information is composed using standard financial computers and data structures, and the message is encrypted using the public and private keys assigned to target device and transaction, respectively. The keys assigned to each device, along with their paging addresses, are stored in the user database associated with the processing computer. After each message is encrypted, it is sent like a normal paging message to the paging system via the public telephone system.

The first financial transaction processor 1100 will be more fully discussed with reference to FIG. 12 which integrates the first financial transaction processor 1100 with a wireless selective call signaling system controller.

Figure 12:
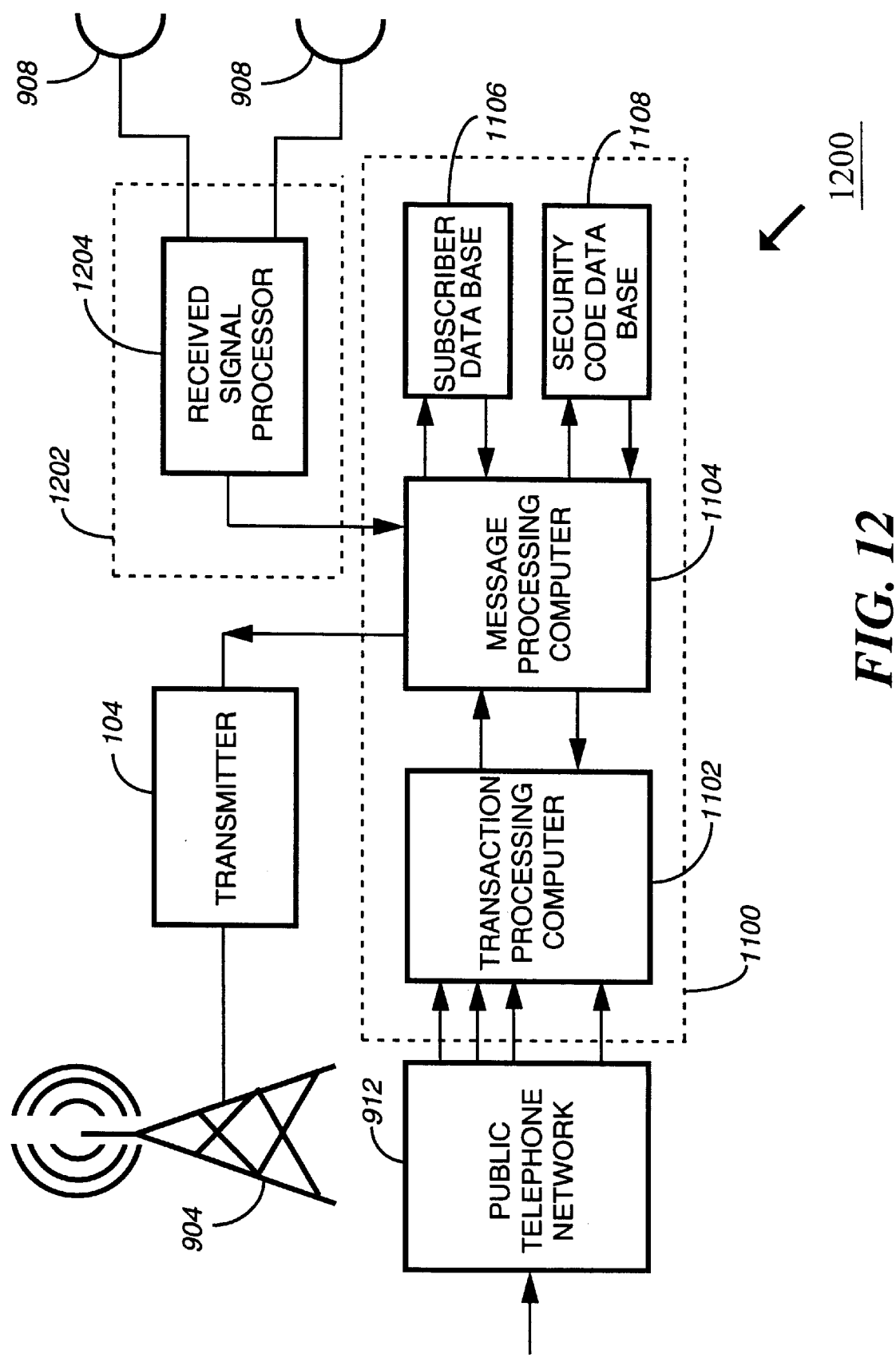
FIG. 12 is a functional diagram of a wireless selective call signaling system controller that implements a combined 1-way and 2-way secure messaging system capable of signalling the financial messaging units.

Referring to FIG. 12, the illustration shows a functional diagram of a wireless selective call signaling system controller that implements a combined 1-way and 2-way secure messaging system capable of signalling the financial messaging units.

The wireless selective call signaling system controller 1200 comprises the first financial transaction processor 1100 along with a transmitter 104 and associated antenna 904, and in 2-way RF systems, at least one receiver 1202 system comprising a received signal processor and at least one receive antenna 908. Preferably, several of at least one receiver 1202 systems may be distributed over a wide geographical area to receive the low power transmissions broadcast by 2-way financial messaging units 906. The number of receiver 1202 systems in any given geographical area is selected to insure adequate coverage for all inbound transmissions. As one of ordinary skill in the art will appreciate, this number may vary greatly depending on terrain, buildings, foliage, and other environmental factors.

The wireless selective call signaling system controller 1200 represents a closely coupled implementation of the overall secure messaging system. In practice, a regulator (e.g., bank, credit card issuer, etc.) may not want the responsibility of maintaining the RF infrastructure, i.e., the transmitter 104 and associated antenna 904, and the at least one receiver 1202 system. Consequently, a conventional wireless messaging service provider or the like would provide and maintain the RF infrastructure, and the regulator would utilize that RF infrastructure in a conventional manner to communicate secure financial transaction messages between the regulator and the financial messaging units 906.

As a first alternative to the preceding operation, the selective call signaling system controller 1200 may operate to encrypt, encode, and transmit secure financial transaction messages received from a regulator, where the first financial transaction processor 1100 has generated and encrypted the secure financial transaction message, and the selective call signaling system controller 1200 further encrypts the secure financial transaction message, for a second time. This increases the level of security of an associated secure financial transaction message by encapsulating it using a second, unrelated encryption. Subsequently, the financial messaging unit 906 decodes and decrypts the doubly encrypted message, revealing the secure financial transaction message in its encrypted state, and thus maintaining the end-to-end security required for a financial transaction. Similarly, the selective call signaling system controller 1200 receives messages originating from the financial messaging unit 906 and passes the secure financial transaction message in its encrypted state to a regulator for decryption and processing.

As a second alternative to the preceding operation, the selective call signaling system controller 1200 may operate to encode and transmit secure financial transaction messages communicated between the regulator and the financial messaging unit 906. In this case, the first financial transaction processor 1100 at the regulator has generated and encrypted the secure financial transaction message, and the selective call signaling system controller 1200 operates to associate a selective call address with the secure financial transaction message based on a received destination identifier, then transmit a resulting selective call message for receipt by the financial messaging unit 906. Subsequently, the financial messaging unit 906 decodes the selective call message, revealing the secure financial transaction message in its encrypted state, and thus maintaining the end-to-end security required for a financial transaction. As with the prior operation, the selective call signaling system controller 1200 further operates to receive messages originating from the financial messaging unit 906 and passes the secure financial transaction message in its encrypted state to a regulator for decryption and processing.

Figure 13:
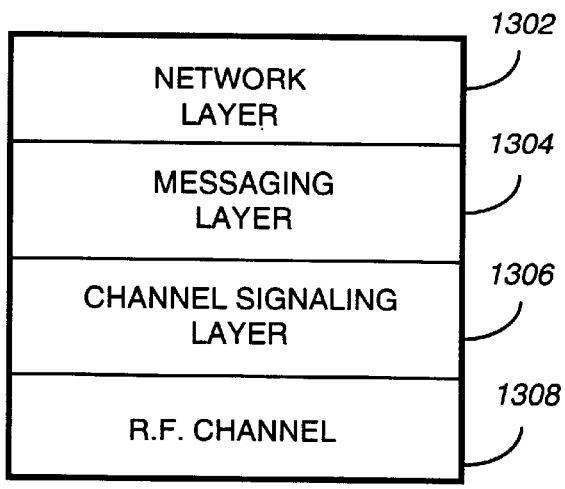
FIG. 13 depicts the various layers of a messaging system in a format that is similar to the Organization Standards International (OSI) stack diagram that is well known in the electronics industry.

Referring to FIG. 13, the illustration shows the various layers of a messaging system in a format that is similar to the Organization Standards International (OSI) stack diagram that is well known in the electronics industry.

With respect to the present invention, the network layer 1302 is a point at which financial transactions are created. These financial transactions are then communicated to a messaging layer 1304 where appropriate selective call messages are formed for inclusion in a transport protocol such as Motorola's FLEX or POCSAG. The channel signalling layer 1306 or transport layer represents the point where the low level transport protocols mentioned above are implemented. Finally, the RF channel 1308 is the physical media on which the low level transport protocol communicates the selective call messages containing the financial transactions.

Figure 14:
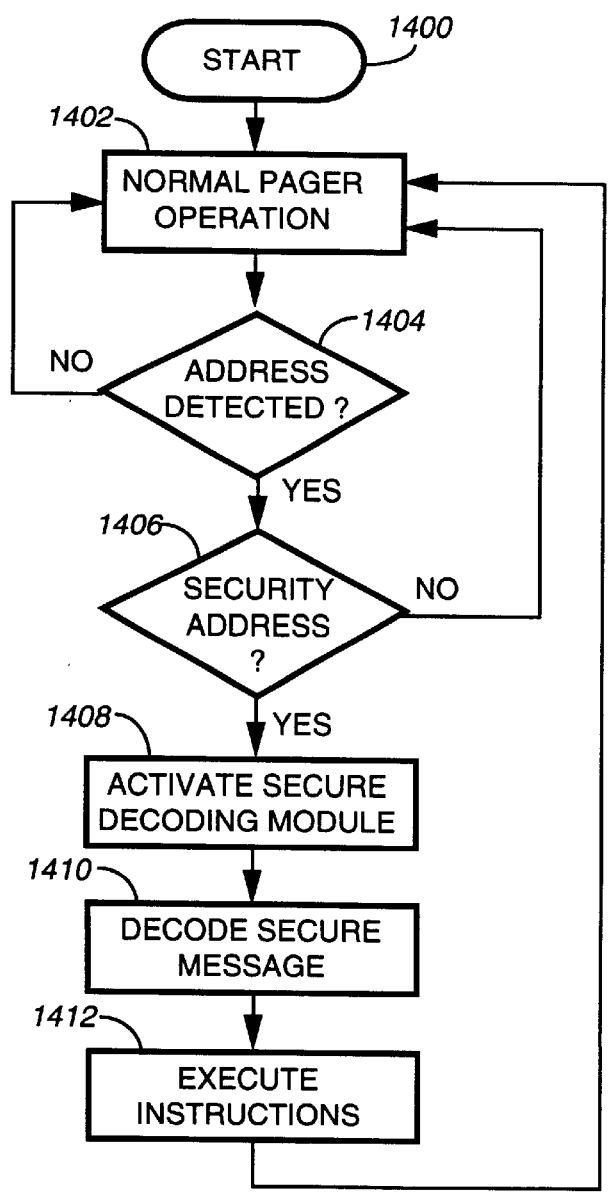
FIG. 14 is a flow diagram depicting typical operation of a financial messaging unit in accordance with the preferred embodiment of the present invention.

Referring to FIG. 14, the flow diagram shows typical operation of a financial messaging unit in accordance with the preferred embodiment of the present invention.

When activated 1400, the financial messaging unit 906 (denoted as a pager for clarity of explanation) operates "normally," that is, it waits in a standby 1402 state searching for its selective call address 1404. If the financial messaging unit detects its address, and in particular it detects a security address 1406, e.g., a specific selective call address associated with a single unique account, or one of several unique accounts, the financial messaging unit 906 recovers the secure financial transaction message to effect a financial transaction. If steps 1404 or 1406 fail, control returns to step 1402 in which the financial messaging unit resumes normal operation. Once the financial messaging unit 906 determines that a secure financial transaction message is received, the Smart Card function module 1014 is activated 1408 and the secure financial transaction message may be decoded 1410. Decoding as mentioned here can represent the recovery of the secure financial transaction message from the native selective call protocol, e.g., from a FLEX™ or POCSAG data or information word, or decoding can include the step of decrypting the secure financial transaction message to recover its contents representing an electronic cash token value, a credit value, a debit value, or other information relating to a secure financial transaction such as cryptographic message or session keys. According to the content of the secure financial transaction message, the control logic 1016 and processor 1006 operate to execute instructions 1412 pertinent to the financial transaction being executed.

Figure 15:
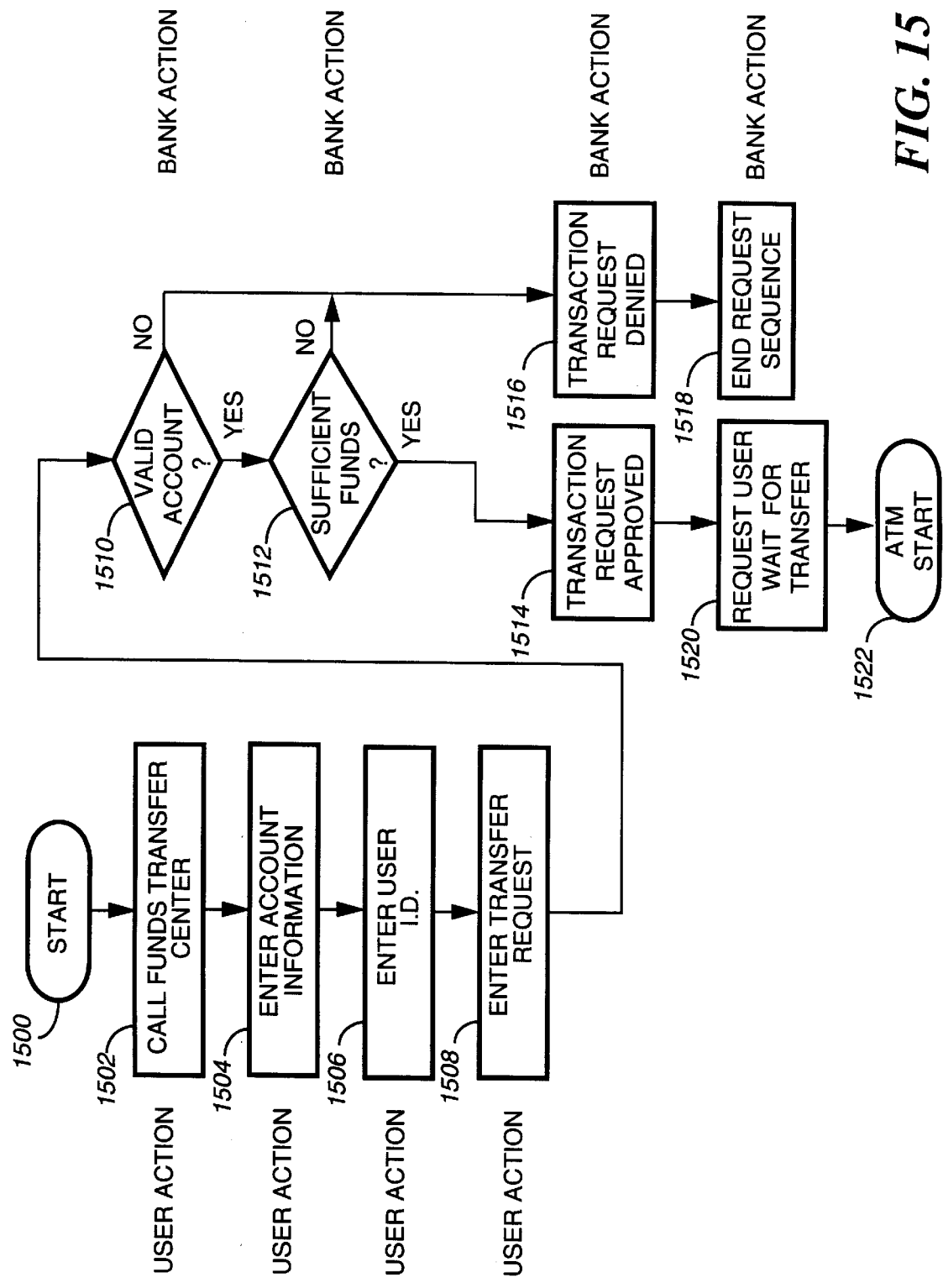
FIG. 15 illustrates a typical sequence associated with requesting and authorizing the electronic transfer of funds or debit of funds by and from a wireless financial messaging unit.

Referring to FIG. 15, the illustration shows a typical sequence associated with requesting and authorizing the electronic transfer of funds or debit of funds by and from a wireless financial messaging unit.

A financial transfer sequence is initiated 1500 by a customer calling his or her bank 1502, identifying themselves 1504 via a PIN number or other account information 1506, and requesting a transfer or other financial transaction 1508 for communication to their wireless financial messaging unit 906.

After verifying the identity of the customer 1510 and the appropriate account information 1512, the bank or regulator initiates a sequence of events to effect the electronic transfer of the funds, granting of credit, or the like 1604. In a first case, a financial transaction is approved when the financial transaction request is authenticated as originating from an authorized party and the financial transaction is permitted by a regulator 1514. Typically, regulators permit financial transactions when a party has sufficient funds as in a cash load or debit request, or when a party has sufficient credit available to complete a transaction. Preferably, upon approval, the financial messaging unit 906 prompts the user to wait for the transaction 1520 and the system begins completion of the financial transaction 1522.

In a second case, the first financial transaction processor denies completion of the financial transaction based on the financial transaction request when at least one of the financial transaction request is not authenticated as originating from an authorized party and the financial transaction is not permitted by a regulator 1516. Typically, regulators deny financial transactions when a party has insufficient funds in the cash load or debit request, or when a party has insufficient credit available to complete a transaction. If the regulator denies the financial transaction, the request is terminated 1518 and the financial messaging unit 906 returns to normal operation.

Figure 16:
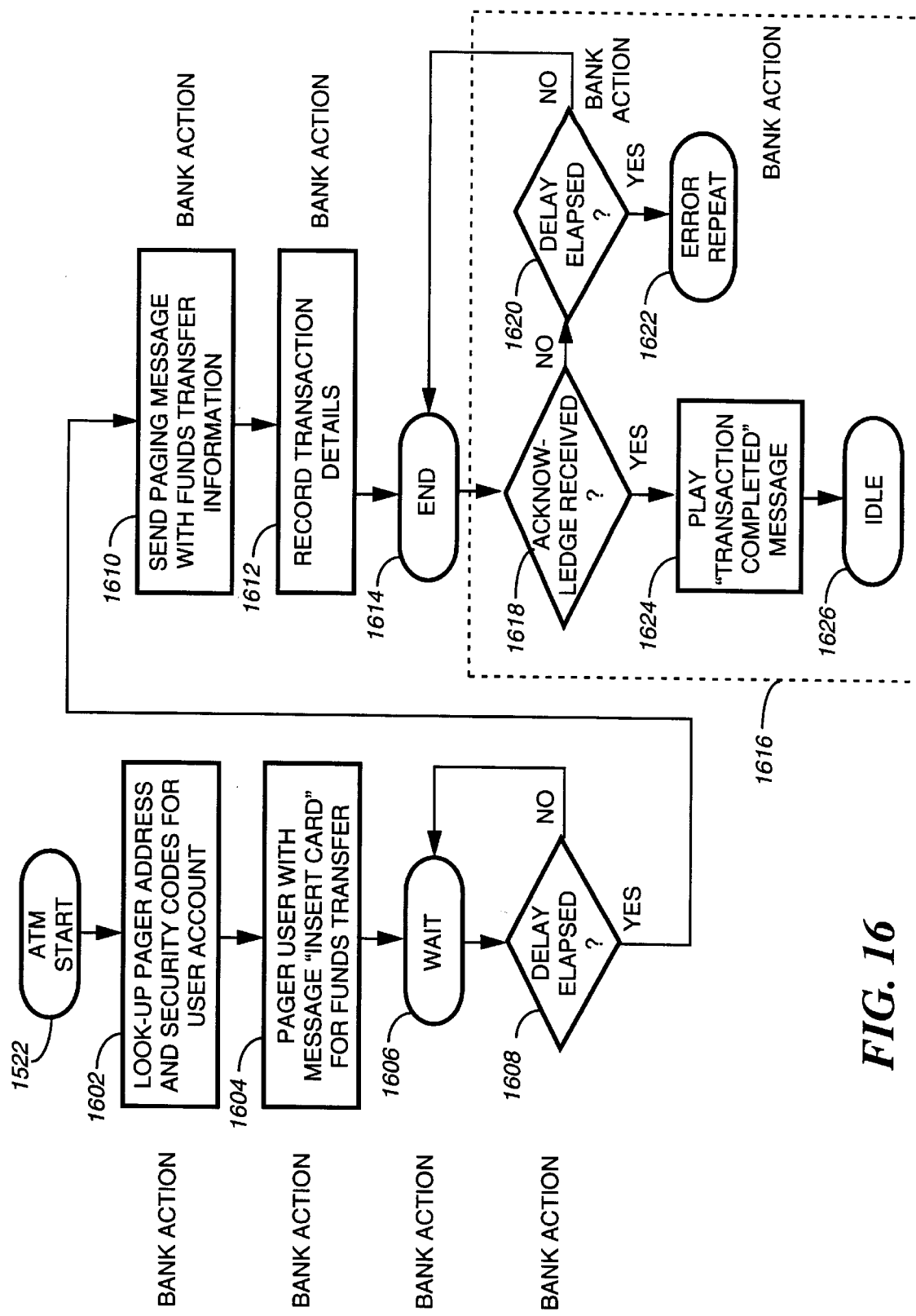
FIG. 16 illustrates a typical sequence associated with the wireless transfer of funds or debit of funds by and from a wireless financial messaging unit in both a 1-way and a 2-way secure communication system.

Referring to FIG. 16, the illustration shows a typical sequence associated with the wireless transfer of funds or debit of funds by and from a wireless financial messaging unit in both a 1-way and a 2-way secure communication system.

Completion of the financial transaction 1522 begins by the regulator or issuer looking up the destination identifier and security code (e.g., public or private key) for a user account 1602 associated with at least one financial messaging unit 906. The secure messaging system then generates the secure financial transaction message which is communicated to the wireless selective call signaling system controller where the selective call message processor 1104 executes a control program that receives selective call message requests comprising a destination identifier and the secure financial transaction message and encapsulates the secure financial transaction message in a selective call message that includes a selective call address corresponding with the destination identifier. This selective call message is then distributed to a selective call transmission service in response to the destination identifier. The selective call transmission service broadcasts the selective call message to the financial messaging unit 906 that receives the selective call message. Optionally, the financial messaging unit 906 may send a first message prompting the user to insert a Smart Card 920 for funds transfer or the like. The bank would then wait 1606 an appropriate time period 1608, then send a data transmission comprising information with the account number of the Smart Card 920 to be credited, the amount of the transaction, and coded information to verify that the Smart Card 920 to be debited is valid and not a counterfeit 1610. Obviously, if the Smart Card 920 is integrated with the financial messaging unit 906, steps 1604, 1606, and 1608 need not be performed. A bank will typically record 1612 the success or failure of a transaction upon its completion 1614.

In a financial messaging unit 906 having 2-way capability 1616, the bank can wait for receipt of an acknowledgment 1618 comprising a returned secure financial transaction message that confirms execution of the financial transaction. When the financial transaction is successfully completed, an optional message may be presented 1624 to the user at the financial messaging unit 906 before the financial messaging unit 906 returns to an idle state 1626. Alternatively, if no acknowledgment is received after a predetermined delay period 1620, the bank may re-initiate the prior financial transaction 1622.

In a variation of the operation discussed in reference to FIGS. 14–16, the user may remain in communication during the financial transaction, and the bank may receive a non-real time acknowledgment that the transaction was completed successfully using an alternate path, i.e., one other than the RF reverse channel. This can be accomplished by either using a 1-way or 2-way paging device in a wired ATM machine, or by having the user remain on a phone or other communication device during the entire transaction. Additionally, a distinctive audio alert pattern can be generated by the financial messaging unit 906 to signal that the financial transaction has been completed without error.

Additionally, if an address is detected that is associated with a normal messaging function, the financial messaging unit 906 will operate as a normal paging device. However, if the detected address is associated with a secure data transmission address, the secure decoder module may be activated, the received secure financial message may be decrypted, and the information contained in the message would be processed in accordance with either the contents of the message or with the rules associated with the received address.

One of ordinary skill in the art will appreciate that the preceding discussion regarding the claimed invention in not meant to limit the system to a particular transport protocol, wireless media, cryptographic scheme, or physical communication device. Consequently, the claimed invention and other variations made possible by the teachings herein represent only a few select ways that a secure messaging system for communicating financial information can be implemented using the unique principles taught in the present invention.

It is in the preceding spirit that we claim the following as our invention:

1. A portable 2-way secure financial messaging unit, comprising:
   a receiver;
   a selective call decoder coupled to the receiver;
   a financial transaction processor coupled to the selective call decoder;
   a main processor coupled to the financial transaction processor and the selective call decoder; and
   a transmitter coupled to the main processor.

2. The portable 2-way secure financial messaging unit according to claim 1 wherein the financial transaction processor receives and decrypts a secure financial transaction message coupled from the selective call decoder.

3. The portable 2-way secure financial messaging unit according to claim 2 wherein a received secure financial transaction message is decoded by the selective call decoder and passed directly to the financial transaction processor to prevent unauthorized access to information contained in the secure financial transaction message.

4. The portable 2-way secure financial messaging unit according to claim 3 wherein the received secure financial transaction message is decrypted by the financial transaction processor and coupled to a secure memory that retains information decrypted from the secure financial transaction message.

5. The portable 2-way secure financial messaging unit according to claim 2 wherein the secure financial transaction message comprises a financial transaction session key.

6. The portable 2-way secure financial messaging unit according to claim 5 wherein the secure financial transaction message comprises a returned cash value.

7. The portable 2-way secure financial messaging unit according to claim 5 wherein the secure financial transaction message comprises a returned fund transfer value.

8. The portable 2-way secure financial messaging unit according to claim 5 wherein the secure financial transaction message comprises a returned credit value.

9. The portable 2-way secure financial messaging unit according to claim 2 wherein a received secure financial transaction message is decoded by the selective call decoder and passed directly to an attached smart card to prevent unauthorized access to information contained in the secure financial transaction message.

10. The portable 2-way secure financial messaging unit according to claim 1, comprising:
    a secure message generator coupled to the financial transaction processor and the main processor.

11. The portable 2-way secure financial messaging unit according to claim 10 wherein the financial transaction processor encrypts and the secure message generator generates a secure financial transaction message that is coupled to the main processor for transmission by the transmitter.

12. The portable 2-way secure financial messaging unit according to claim 11 wherein the secure financial transaction message comprises a financial transaction request.

13. The portable 2-way secure financial messaging unit according to claim 11 wherein the secure financial transaction message comprises a cash load request.

14. The portable 2-way secure financial messaging unit according to claim 11 wherein the secure financial transaction message comprises a fund transfer request.

15. The portable 2-way secure financial messaging unit according to claim 11 wherein the secure financial transaction message comprises a credit request.

16. A portable 2-way secure financial messaging unit, comprising:
    a receiver;
    a selective call decoder coupled to the receiver;
    a financial transaction processor coupled to the selective call decoder, the financial transaction processor comprising:
       a security code processor;
       a secure non volatile read only memory coupled to the security code processor;
       a secure erasable read only memory coupled to the secure non volatile read only memory;
       an input/output interface coupled to the secure erasable read only memory; and
       control logic coupled to the security code processor, the secure non volatile read only memory, the secure erasable read only memory, and the input/output interface;
    a main processor coupled to the financial transaction processor and the selective call decoder; and
    a transmitter coupled to the main processor.

17. The portable 2-way secure financial messaging unit according to claim 16, comprising:
    a smart card coupled to the financial transaction processor via the input/output interface.

18. The portable 2-way secure financial messaging unit according to claim 16 wherein the financial transaction processor receives and decrypts a secure financial transaction message coupled from the selective call decoder.

19. The portable 2-way secure financial messaging unit according to claim 18 wherein a received secure financial transaction message is decoded by the selective call decoder and passed directly to the financial transaction processor to prevent unauthorized access to information contained in the secure financial transaction message.

20. The portable 2-way secure financial messaging unit according to claim 19 wherein the received secure financial transaction message is decrypted by the financial transaction processor and coupled to a secure memory that retains information decrypted from the secure financial transaction message.

21. The portable 2-way secure financial messaging unit according to claim 18 wherein the secure financial transaction message comprises a financial transaction session key.

22. The portable 2-way secure financial messaging unit according to claim 21 wherein the secure financial transaction message comprises a returned cash value.

23. The portable 2-way secure financial messaging unit according to claim 21 wherein the secure financial transaction message comprises a returned fund transfer value.

24. The portable 2-way secure financial messaging unit according to claim 21 wherein the secure financial transaction message comprises a returned credit value.

25. The portable 2-way secure financial messaging unit according to claim 18 wherein a received secure financial transaction message is decoded by the selective call decoder and passed directly to an attached smart card to prevent unauthorized access to information contained in the secure financial transaction message.

26. The portable 2-way secure financial messaging unit according to claim 16, comprising:

a secure message generator coupled to the financial transaction processor and the main processor.

27. The portable 2-way secure financial messaging unit according to claim 26 wherein the financial transaction processor encrypts and the secure message generator generates a secure financial transaction message that is coupled to the main processor for transmission by the transmitter.

28. The portable 2-way secure financial messaging unit according to claim 27 wherein the secure financial transaction message comprises a financial transaction request.

29. The portable 2-way secure financial messaging unit according to claim 27 wherein the secure financial transaction message comprises a cash load request.

30. The portable 2-way secure financial messaging unit according to claim 27 wherein the secure financial transaction message comprises a fund transfer request.

31. The portable 2-way secure financial messaging unit according to claim 27 wherein the secure financial transaction message comprises a credit request.

* * * * *